(12) United States Patent
De Doncker et al.

(10) Patent No.: US 10,608,522 B2
(45) Date of Patent: Mar. 31, 2020

(54) ELECTRICAL CIRCUIT WITH AUXILIARY VOLTAGE SOURCE FOR ZERO-VOLTAGE SWITCHING IN DC-DC CONVERTER UNDER ALL LOAD CONDITIONS

(71) Applicant: Rheinisch-Westfälische Technische Hochschule (RWTH) Aachen, Aachen (DE)

(72) Inventors: Rik W. De Doncker, Leuven (BE); Johannes Voss, Aachen (DE)

(73) Assignee: Rheinisch-Westfälische Technische Hochschule (RWTH) Aachen, Aachen (DE)

( * ) Notice: Subject to any disclaimer, the term of this patent is extended or adjusted under 35 U.S.C. 154(b) by 0 days.

(21) Appl. No.: 16/456,254

(22) Filed: Jun. 28, 2019

(65) Prior Publication Data
US 2020/0007022 A1    Jan. 2, 2020

(30) Foreign Application Priority Data

Jun. 29, 2018  (DE) .......................... 10 2018 210 806

(51) Int. Cl.
| | | |
|---|---|---|
| *H02M 1/08* | (2006.01) | |
| *H02M 3/335* | (2006.01) | |
| *H02M 1/088* | (2006.01) | |
| *H02M 1/00* | (2006.01) | |

(52) U.S. Cl.
CPC .......... *H02M 1/083* (2013.01); *H02M 1/088* (2013.01); *H02M 3/33576* (2013.01); *H02M 2001/0058* (2013.01)

(58) Field of Classification Search
CPC ........ H02M 1/08; H02M 1/083; H02M 1/088; H02M 1/096; H02M 3/33507; H02M 3/33523; H02M 3/3569; H02M 3/33576; H02M 2001/0058
See application file for complete search history.

(56) References Cited

U.S. PATENT DOCUMENTS

| | | | |
|---|---|---|---|
| 5,027,264 A | | 6/1991 | DeDoncker et al. |
| 5,432,695 A | * | 7/1995 | Vlatkovic ............. H02M 7/162 363/127 |
| 5,949,669 A | | 9/1999 | Bruckmann et al. |

(Continued)

FOREIGN PATENT DOCUMENTS

DE         19536470 A1    4/1997

*Primary Examiner* — Matthew V Nguyen
(74) *Attorney, Agent, or Firm* — The Webb Law Firm

(57) ABSTRACT

An electrical circuit comprising an n-port m-phase active bridge converter with n≥2 and m≥1, where each port can be operated as an input or an output port, wherein each of the n ports has m phase legs with multiple active switches with parallel connected snubber or resonant capacitors, whereby the n ports can convert a DC-voltage into an AC voltage, the n ports connected via an m-phase transformer or over m separate transformers each connected to each of the m phase legs of each of the n ports to transfer power between the ports, wherein an auxiliary circuit is connected to the transformers to convert a part of a transformer input voltage and energy via an auxiliary voltage source into a DC mid-point capacitor of a DC-link of at least one of the n-port m-phase active bridge converters to recharge the DC mid-point capacitor.

15 Claims, 4 Drawing Sheets

(56) References Cited

U.S. PATENT DOCUMENTS

| | | | |
|---|---|---|---|
| 6,984,964 B2* | 1/2006 | Chang | H02M 1/4216 |
| | | | 323/207 |
| 7,126,833 B2 | 10/2006 | Peng | |
| 8,687,388 B2* | 4/2014 | Jang | H02M 1/4216 |
| | | | 363/44 |
| 9,487,098 B2 | 11/2016 | Yamada et al. | |
| 2006/0109694 A1 | 5/2006 | Peng | |
| 2012/0155124 A1* | 6/2012 | Cheng | H02M 3/337 |
| | | | 363/24 |
| 2015/0146455 A1* | 5/2015 | Engel | H02M 3/33584 |
| | | | 363/17 |
| 2015/0256089 A1 | 9/2015 | Yamada et al. | |
| 2019/0238050 A1* | 8/2019 | Jimichi | H02M 3/33592 |

\* cited by examiner

ELECTRICAL CIRCUIT WITH AUXILIARY VOLTAGE SOURCE FOR ZERO-VOLTAGE SWITCHING IN DC-DC CONVERTER UNDER ALL LOAD CONDITIONS

CROSS-REFERENCE TO RELATED APPLICATION

This application claims priority to German Patent Application No. 10 2018 210 806.4 filed Jun. 29, 2018, the disclosure of which is hereby incorporated by reference in its entirety.

FIELD OF INVENTION

The invention relates to an electrical circuit comprising an n-port m-phase multi-directional active bridge DC-DC converter and an auxiliary circuit with an auxiliary voltage source to at least reduce losses during commutation processes without involving a boost current to allow zero-voltage soft-switching of the multi-directional active bridge DC-DC converter under all operating conditions and to a corresponding method.

BACKGROUND OF THE INVENTION

A DC-DC converter, also known as a power converter, refers to an electric circuit that converts a direct current or voltage fed to the input side into a direct current or voltage having a higher, lower or inverted voltage level. DC-DC converters can be found, among others, not only in switched-mode power supply units of PC power supply packs, notebooks, mobile phones and HiFi devices, but also as voltage conditioners in motor drive systems, maximum power point (MPP) trackers in PV installations and battery chargers Their advantages in comparison to linear power supply units are their higher efficiency and lower heat generation. In a linear voltage regulator or in a series resistor, in contrast, the superfluous voltage simply "burns off".

DC-DC converters are also available as completely encapsulated converter modules that are sometimes intended for direct insertion into printed circuit boards. The output voltage can be lower than, equal to or greater than the input voltage, depending on the model. The best-known modules are the ones that transform a low voltage into a galvanically isolated extra-low voltage. The encapsulated DC-DC converters are available, for example, for insulation voltages ranging from 1.5 kV to over 3 kV, and they serve to supply power to small consumers in direct-voltage networks such as, for example, 24 V in industrial installations or 48 V in telecommunications or in the realm of electronic modules such as, for instance, 5 V for digital circuits or ±15 V for the operation of operational amplifiers. DC-DC converters can also be found in high-power applications, such as automotive and traction. In automotive applications, for example, they serve to charge batteries or to supply power from the batteries or fuel cells to the dc-link of the traction inverter and the on-board low-voltage power supply. DC-DC converters are classified according to various criteria and divided into many different topologies (such a hard-switched, resonant, transition resonant, galvanic isolated, unidirectional, multi-phase, etc. types). In contrast to unidirectional converters, when it comes to bidirectional, or multidirectional, multi-port DC-DC converters, it is immaterial which terminal(s) is defined as the input and which terminal(s) is defined as the output. A bidirectional energy flow allows power to flow from the defined input (primary side) towards the output (secondary side) and vice versa. In the case of multi-port active bridge converters, the ports are not called primary or secondary side, but are instead numbered, e.g. port 1, port 2, port 3 etc.

In DC-DC converters that are based on the functional principle of a bidirectional two-port active bridge converter, the so-called dual active bridge (DAB) topology, the DC input voltage is converted by an input converter into an AC voltage, which is then fed to a transformer or inductor(s). Transformers are used to provide galvanic isolation between the DC ports. The output of the transformer is connected to an output converter that once again converts the AC voltage into a DC output voltage for a load. These DC-DC converters can be implemented in single-phase or multi-phase configurations. Such DAB DC-DC converter topologies as disclosed, for example, in U.S. Pat. No. 5,027,264, constitute high-efficiency converter topologies that allow a bidirectional energy flow and galvanic separation via the transformer and operation at high voltages. This type of converter is particularly well suited for use in high power DC networks, e.g. medium-voltage and low-voltage DC grids and DC collectors for windfarms and large PV installations. Since the transferred power in medium and low-voltage grids is not constant, the need of power flow control and a variable voltage ratio arises. The DAB has the highest efficiency while operating in zero-voltage soft-switching (ZVS) mode under high-power conditions. For low-power operation however, the soft-switching boundary can be violated. To exploit fully renewable energy sources under all weather conditions, operation of the DC-DC converter under every load condition at high-efficiency is needed.

The three-phase DAB DC-DC converter may include at least two actively switched three-phase bridges (phase legs) linked by a three-phase transformer, which may be connected in a star-star (Y-Y) configuration. In order to operate under zero-voltage soft-switching conditions, snubber or resonant capacitors can be placed across the semiconductor devices. However, when the DAB is operating under partial load conditions the magnetically stored energy in the transformer inductance may not be sufficient to fully commutate the voltage of the capacitors. Hard-switching events also occur when the load current remains freewheeling in a diode prior to switching off the anti-parallel active switch while turning on the other switch in the inverter phase leg. The semiconductor devices can even be destroyed when the energy stored in the capacitors is discharged in the devices during the hard-switched turn-on process. To improve the commutation process auxiliary circuits can be implemented to provide a boost current that ensures full commutation of the capacitor voltages. However, auxiliary circuits in the state of the art not only have to commutate the current from the diode to the active switch and provide a boost current to commutate the capacitor voltage but also needs to compensate its losses. Therefore, the boost current needs to be accurately controlled and measured to guarantee safe ZVS operation. Hence, the state of the art circuits require fast switches, high-bandwidth and precise boost current control, which makes said circuitry very expensive.

Therefore, it is desirable to provide means for a DC-DC converter to operate in zero-voltage soft-switching (ZVS) mode under all load conditions and to overcome the disadvantages of the state of the art.

SUMMARY OF THE INVENTION

It is an objective of the invention to provide a means for a n-port m-phase active bridge DC-DC converter to reduce losses during the commutation process to allow zero-voltage soft-switching without using a boost current.

This objective is solved by an electrical circuit for zero-voltage switching of a DC-DC converter under all load conditions comprising an n-port m-phase active bridge converter with n≥2 and m≥1, where each port can be operated as an input or an output port, wherein each of the n ports has m phase legs with multiple active switches with parallel connected snubber or resonant capacitors, whereby the ports can convert a DC-voltage into an AC voltage and vice versa, whereby the ports are connected via a m-phase transformer or over m separate transformers each connected to each of the m phase legs of each of the n ports to transfer power between the ports, wherein an auxiliary circuit is connected to the transformers to convert a part of a transformer input voltage and energy via an auxiliary voltage source into a DC mid-point capacitor of a DC-link of at least one of the n-port m-phase active bridge converters to recharge the DC mid-point capacitor enabling the auxiliary circuit to regulate the voltage of the mid-point capacitor providing under all load conditions zero-voltage soft-switching operation of the switches of the converter phase legs.

A multidirectional n-port m-phase active bridge converter has n number of ports and m number of phases, where n, m⊆N. Said converter is commonly known in its two-port m-phase form, which is also called Dual Active Bridge converter, short DAB converter. For a n-port active bridge converter, where n>2, the term "multiport active bridge DC-DC converter", short "MAB converter", and "multiport DAB converter" are used interchangeably. When power is transferred in a MAB converter topology, at least one of the ports converts a DC input voltage into an AC input voltage as input port/s and at least one of the other ports converts an AC output voltage into a DC output voltage as output port/s. But in general terms, every port can convert a DC voltage into an AC voltage and every port can have bidirectional power flow. In standby conditions, when the transferred power is zero between the ports, all the ports convert a DC voltage into an AC voltage that generates only reactive power in the transformer.

For DAB converters, the primary side typically refers to the input port of the DC-DC converter. In a corresponding manner, the secondary side refers to the other side of the transformer that is connected to the output port. If the primary and secondary sides are insulated from each other, their respective ports are connected via a transformer. Non-isolated variants can be realized using inductors or autotransformers between primary and secondary ports. If the DAB converter is configured so as to be bidirectional, then the power can be either transferred from the primary side to the secondary side or vice versa. The DC-DC converter according to the present invention can be configured as a multi-phase DAB converter with m phases, which can be configured as a single phase, three-phase or five-phase etc. DAB or multi-port active bridge (MAB) converter.

The number of phases m determines the minimum number of voltage bridges inside a port, which are the so-called phase legs. A three-phase DAB has at least three phase legs inside one port, where in case of more than three phase legs, some phase legs are switched in parallel to provide three effective phases. Each phase leg has active switches in two-level or multi-level configuration. By switching the active switches (switching operation with a switching pattern) a DC input voltage can be converted into an AC input voltage to the transformer. Vice versa an AC output voltage into a DC output voltage. As a rule, the power semiconductor switches are completely turned on or off. Hence, in case of two-level converter phase legs, alternating voltages that have approximately the shape of a square-wave (square-wave voltage) are formed at the transformer. In case of multi-level converters, multi-step waveforms are created. As a result, the voltage over the transformer windings becomes stepped. "Snubbers" or snubber capacitors, ensure that the edges of the square-wave voltage are not infinitely steep, which means that the form deviates from that of a square-wave voltage (stepped form at the transformer windings). Snubbers are employed to ensure a dynamic voltage balancing in switching operations (snubber network). The term "snubber network" refers to an electric circuit having snubber elements that, in the case of an abrupt interruption of the current flow, are meant to neutralize, for example, interfering high frequencies or voltage peaks that usually occur when inductive loads are switched. Snubber elements limit the rate of voltage rise or the rate of current rise on semiconductors. For example, capacitive snubbers provide zero-voltage switching during turn-off of the power semiconductors, thereby reducing switching losses. In the present invention snubbers are referred to as "snubber or resonant capacitors", as the snubber capacitors can also be operated in resonant mode, especially when forming a resonant circuit with the auxiliary inductances of the auxiliary circuit.

Depending on the configuration, two or more active switches per phase leg can be employed. Suitable switches for the phase legs are active semiconductors (power semiconductors) such as, for example, gate turn-off thyristors, transistors, MOSFETs, IGBTs (insulated gate bipolar transistors) or ICGTs (integrated gate-commuted thyristor). As an alternative, the person skilled in the art can also employ other suitable active switches.

Omitting snubbers would increase the turn-off switching losses significantly. Also, in practice Gate turn-off Thyristors (GCTs) require in any case additional turn-on snubbers (=auxiliary circuit) to protect the main power diodes.

The term "transformer" as set forth here refers to the magnetic circuit—usually a ferrite or iron core—with the appertaining windings of the primary and secondary phase legs around the magnetic core. Alternatively, also air core transformers may be used as the transformer(s). If each of the phase legs comprises a separate transformer, only the conductors of a primary phase leg and the appertaining other secondary phase leg are wound around the transformer that is associated with this phase leg. The term "multiphase transformer" or "m-phase transformer", in contrast, refers to a transformer that has a shared magnetic core for all phase legs, whereby the windings of the phase legs of a first, second port and nth port are arranged in different areas of the magnetic core. The function of a DC-DC converter is to bring about a systematic AC voltage drop over the leakage inductance, e.g., the so-called short circuit impedance, of the transformer and thus to control the power flow. Actively switched phase legs make it possible to independently control the load angle between the primary and secondary alternating voltages present on the transformer and thus to systematically control the power flow.

The electrical circuit can also utilize a controlling unit, which does not have to be part of the n-port m-phase active bridge converter, but can also be an external component, which is connected to the n-port m-phase active bridge converter for controlling the active switches. This is advantageous when the controlling should be flexibly adapted to the given application. Such a controlling unit, which is not an integral part of an n-port m-phase active bridge converter, can be built into an interconnected network with, for example, a separately built microcontroller, digital signal processor (DSP) or programmable logic devices, such as FPGA. These or similar devices can be connected to the switches via a power semiconductor gate driver, which is conventionally realized as a part of the power electronic converters. The controlling unit can also be integrated onto the same circuit board of the semiconductor switches via conducting paths or integrated onto external circuit boards and then connected via cables. The connection (e.g. cable) can be realized in different ways, e.g. via a printed circuit board, normal cable, coaxial cable, ribbon cable, RJ-45 cable, optical signals (e.g. optical waveguide) etc. As long as the DC-DC converter offers a connecting port for a gate driver, the controlling unit can also be realized as a control rack/controlling platform, which is connected with the DC-DC converter.

The auxiliary voltage source can be any source providing DC voltage into the mid-point capacitor. All state of the art voltage sources can be considered as voltage stabilizer.

In an embodiment the auxiliary voltage source is provided by additional windings at the transformer coupled to the mid-point capacitor via one or more diode rectifiers, whereby the voltage of the auxiliary voltage source is defined by a ratio of the additional windings to transformer windings of the converter; or by an auxiliary transformer connected to the mid-point capacitor via a diode rectifier, where the auxiliary circuit is connected to the transformer. The additional windings to the middle frequency transformer windings of the converter have the advantage that no additional transformer is needed to stabilize the voltage. The auxiliary transformer has the advantage, that for existing DC-DC converters, where the transformer of the converter can not be modified anymore, a voltage stabilizer can be guaranteed. The voltage ratio is adapted by changing the number of windings of the auxiliary transformer.

The electrical circuit utilizes an auxiliary circuit comprising the auxiliary voltage source, inductances, capacitors and switches. The auxiliary circuit can comprise any form of auxiliary voltage source, which could be one of the embodiments mentioned above, one or more single-phase diode rectifiers $D_r$ and auxiliary inductances $L_r$, auxiliary switches $S_{aux}$ at each phase leg and one or more auxiliary capacitors $C_1$, $C_2$, whereby the snubber capacitors $C_{r1}$, $C_{r2}$ and the auxiliary inductance $L_r$ form a resonant circuit when one auxiliary switch $S_{aux}$ is turned on, which injects an additional current into the phase legs to provide zero-voltage soft-switching under all load conditions.

State of the art auxiliary circuits uses a boost current and has no voltage stabilizer using a feedback from the middle frequency transformer of the converter. By adapting the voltage of the auxiliary voltage stabilizer and thus the voltage of the capacitor $C_M$ the resonant phase of the commutation can be optimized to minimize the losses during commutation. Additionally, a single phase can be switched with the present invention, therefore converters with phases m≥1 can be operated. Using additional windings in the transformer or an additional auxiliary transformer will allows to define a specific ratio to provide soft-switching in the converter operation area. The auxiliary voltage stabilizer then feeds back a fraction of the DC-link into the mid-point capacitor Cm by the use of a single or multi-phase rectifier. During operation the capacitor voltage Cm is kept constant, always in an constant relation to the DC-link voltage.

In the following the two-port, three-phase bi-directional active bridge DC-DC, e.g., the so-called three-phase Dual Active Bridge (DAB) DC-DC converter is exemplary used to explain the invention.

The auxiliary circuit of the present invention is based on a separated dc-link into three part. The natural behavior of an LC resonant tank is to oscillate twice as its initial voltage. By initiating the resonance with a voltage higher then $U_{dc}/2$ would result in a resonance oscillating above the dc-link voltage. To achieve this behavior a second separated dc-link with three in series connected capacitors $C_1$, $C_M$ and $C_2$ can be applied in parallel to the regular dc-link. Instead of initiating the resonance with only $U_{dc}/2$ now the initial voltage is chosen higher by selecting the ratio between the three capacitors. Thus, the mid-point capacitor $C_M$ is used for both commutations: from bottom to top or top to bottom. Here the voltages of the capacitors $U_{C1}=U_{C2}=U_C$ are equal. The resonant circuit is ten initiated with a voltage higher than half of the dc-link voltage $U_C+U_M>Udc/2$. Neglecting the phase current the resonant circuit oscillates twice the initiated voltage, thus the dc-link voltage $U_{dc}$ will always be reached. When the oscillation reaches the dc-link voltage the anti-parallel diodes start to conduct and the residual energy of the resonant tank is fed back creating a zero-voltage condition (ZVC) at the main switch. The current stored in the auxiliary inductor $L_r$ will then be demagnetized by the voltage $U_C$. The slope $I_{res}/dt$ and thus the demagnetization time can be chosen by selecting $U_M$ accordingly. The benefit of this technique is that no boost current is required anymore as it is needed with the conventional system and thus no boost current control is needed.

Normally delays, dead times and losses occur during operation and affect the switching transition. In the state of the art auxiliary circuit, a boost current or a constant magnetization current must be controlled very fast since the current slopes are in the range of 500 A/μs. In the present invention his problem can be easily overcome by selecting the voltage of the middle capacitor $U_M$ accordingly.

In one embodiment the auxiliary switch $S_{aux}$ of the electrical circuit is a zero-current switching device, such as a thyristor, capable of turning on the auxiliary circuit.

The advantage of thyristors is their ability to turn off after a zero-current crossing. But these devices have high reverse recovery (RR) losses and slow turn on times. To reduce the RR, anti-parallel diodes can be added. Diodes, especially SiC diodes, have a lower RR current compared to thyristors and are able to turn faster from conduction to blocking mode. This causes the diode to block the whole voltage and therefore, the RR of the thyristor is suppressed completely. Due to the Schottky configuration, almost no RR occurs. As Schottky SiC diodes are not available for voltage ratings higher than 1.2 kV, three devices can be connected in series for operating at the nominal dc-link voltage of 5 kV. In one embodiment the used SiC diodes for this setup are the IDW40G120C5B manufactured by Infineon, which are rated with a total rms current of 40 A and a peak current of 290 A (10 μs). In another embodiment, to be within the safe operation area (SOA), eight diodes are connected in parallel. In this application the thyristors have to be turned on very fast, the peak gate pulse is set to 15 A, which is almost three time higher the specified manufacturer data. This high current is needed, otherwise the thyristor would not latch (turn on).

When selecting a thyristor, it has to be ensured that the specific ratings of the device are not exceeded. Additionally to the static ratings, special attention has to be paid to the dynamic stress the device is exposed to. As thyristors are limited by their dI/dt and dU/dt capability, the devices have to be chosen according to their maximum rate of change capability.

The dU/dt limitation of commercially available fast switching thyristors is specified to 1000V/µs for reverse blocking devices. But the corresponding RC snubber exceeds the losses of the hard-switching cases of the DAB. Therefore, in an alternative embodiment special thyristors with a dU/dt capability of 4 kV/µs are used. Therefore, the dU/dt capability of the used thyrisor can be increased to 4 kV/µs and the turn-off time is reduced. However, this kind of thyristor is not commercially available.

For the snubber selection the dU/dt rating is not the restricting factor but the voltage overshoot because of the blocking capabilities of the thyristor. As the internal capacitance of the diodes and the auxiliary inductance form a weakly damped resonant circuit, an RC snubber is needed. As there is almost no reverse recovery the diodes start to hold the full blocking capability almost instantly and starts to ring. In an embodiment snubber of 50 nF and 10Ω is used and the voltage overshoot is limited to 3.3 kV, which is suitable for the SiC Schottky diodes.

In another embodiment thyristors can be replaced with active devices such as IGCTs or IGBTs. The biggest advantage is, that IGCTs have no dU/dt limitation and can be used without a snubber. Compared to thyristors, the turn-on losses are lower, as the on state behavior is reached earlier. As reverse blocking IGCT are not commercially available anymore, conventional reverse conducting IGCTs with anti-parallel diodes can be used as an alternative embodiment. The IGCT can be placed with diodes in series as it is done with the thyristors. The diodes block the voltage due to the same principle as explained for the thyristors. The active turnoff capability is not an advantage in this configuration. The IGCT must be turned off then the current is zero again. In case the device turns off during the resonant phase, the inductive energy causes an overvoltage condition. To minimize the reverse recovery SiC diodes are applied in series in an embodiment, where two separate branches are needed. This configuration behaves similar to the configuration with the thyristor and RC snubbers for protecting the snappy SiC diodes are needed again.

To overcome the high turn-on losses of thyristor-based devices (e.g. GTOs or IGCTs), IGBTs can be used as another embodiment, since they turn-on much faster. The higher conduction losses are of no consequence as the device does not stay in conduction mode for long, because the pulse duration is just a few microseconds. The rms current is low compared to the nominal load current. Unfortunately, IGBTs tend to saturate at high-load or overload currents, requiring the IGBTs to be capable of the full resonant current, at a very low rms current. Therefore, for this application, the IGBTs are overrated for the RMS current.

Compared to thyristors, whose current carrying capability is primarily limited by its temperature and $I^2t$, the semiconductor surface area of the used IGBTs is much larger compared to the thyristors. This makes the version with IGBTs economically less feasible.

In another embodiment the number of phases m of the DC-DC converter is 3. Three-phase MAB converters have many advantages. They require much smaller DC capacitors for a given voltage ripple among others. In addition, the currents in the semiconductors at turn-off are lower than in single phase MABs, which can lower switching losses significantly.

The electrical circuit is especially suited to the n-port m-phase active bridge converter is a two-port m-phase active bridge converter, also called dual active bridge converter. The multi-phase DAB converter allows for an interleaved operation which reduces the filter size and turn-off currents of the semiconductor devices. In another embodiment the n-port m-phase active bridge converter is a two-port three-phase active bridge converter. The two-port three-phase active bridge converter is the most common topology for m-phase DAB converters. Aside from the advantages mentioned above, the control methods and power electronics building blocks are already well-developed for three-phase systems. In a three-phase DAB circuit, the fraction of the transformer input voltage feedback into the DC-link of any port is ⅓ of the DC voltage in case of three-phases present. The maximum peak-to-peak voltage variation (voltage across $C_r$) of the star point around the mid-point of the DC link for a m-phase system is (m−2)/m.

It is possible that all n ports are connected to an auxiliary circuit to feedback a fraction of the transformer voltage into the ports. This is preferably if the ports otherwise would be operating in hard-switching mode with high-loss switching devices. The opposite can be viable if one or more ports never operate in hard-switching mode and/or have low-loss switching switches.

In one embodiment, the number of phases m for the electrical circuit is larger than three. Higher number of phases enables higher power levels while reducing the size of DC Link capacitors and transformers. For example, five-phase DAB converters would offer the smallest transformer size.

In one embodiment an auxiliary zero-current switching circuit is added to the electrical circuit to force commutate the snubber capacitors in the n-port m-phase active bridge converter such that the main switches can operate under zero-voltage switching conditions, greatly eliminating switching losses.

In an embodiment the auxiliary inductances are placed between the separate DC-link and the auxiliary switches and four separate inductors are used for the auxiliary circuit. In two-level converter topologies, each phase can have two inductors.

With more than four inductors, e.g. six separate inductors (one per phase) a distribution of losses is achieved.

The electrical circuit of the present invention therefore may guarantee a successful transition without the need of a boost current. Losses, delays or other effects can be compensated easily by choosing the voltage of the middle capacitor $U_M$, and thus adjusting the time of the ZVC at the switching device. No additional high-speed boost current control may be needed as may be necessary for the state of the art boost current control circuit, thus the complexity and costs are reduced tremendously.

The objective of the present invention is also solved by a method of operating an electrical circuit comprising an n-port m-phase active bridge converter with n≥2 and m≥1, where each port can be operated as an input or an output port, wherein each of the n ports has m phase legs with multiple active switches with parallel connected snubber or resonant capacitors, whereby the n ports can convert a DC-voltage into an AC voltage and vice versa, whereby the n ports are connected via a m-phase transformer or over separate m single-phase transformers each connected to each of the m phase legs of each of the ports to transfer power between the ports, the method comprising:

converting a part of a transformer input voltage into a mid-point capacitor of a DC-link of at least one of the ports of the n-port m-phase active bridge converter via an auxiliary circuit comprising an auxiliary voltage source connected to the transformers and the mid-point capacitor;

Providing zero-voltage switching of the switches of the phase legs at zero-voltage under all load conditions by regulating the voltage of the mid-point capacitor via the auxiliary voltage source.

The invention works well even when an even number of phases is connected to the upper and lower (positive and negative) rail voltage of the DC Link, as long as the converter switches an uneven number of phase to one of the rails, the star point voltage will move above or below the mid-point DC voltage.

In an embodiment of the method the regulating of the voltage of the mid-point capacitor is enabled by additional windings at the transformer coupled to the mid-point capacitor via one or more diode rectifiers, whereby the voltage of the auxiliary voltage source is defined by a ratio of the additional windings to transformer windings of the converter; or by an auxiliary transformer connected to the mid-point capacitor via a diode rectifier.

In another embodiment of the method, the n-port m-phase active bridge converter is a two-port m-phase active bridge converter, also called dual active bridge converter. As mentioned before, the three-phase converter reduces the size of filter capacitors and turn-off currents of the semiconductor devices. Moreover, the control methods and power electronics building blocks are well developed for three-phase systems. Additionally, the n-port m-phase active bridge converter can be a two-port, three-port or quad-port three-phase active bridge converter.

In another embodiment the n-port, m-phase active bridge converter uses in one or multiple ports an m-phase three-level converter. The Mid-point DC voltage may be needed to create the extra zero-voltage state at the output. The auxiliary circuit can be applied in the three-level converter by splitting the capacitor Cm in two series connected capacitors.

In another embodiment the auxiliary circuit is applied to one or more ports using multi-level flying capacitor converters. Each DC capacitor at each level is split in three capacitors (Cm in the middle).

Additional advantages, special features and practical refinements of the invention ensue from the subordinate claims and from the presentation below of preferred embodiments making reference to the drawings.

BRIEF DESCRIPTION OF THE DRAWINGS

These and other aspects of the invention are disclosed in detail in the drawings as following.

DETAILED DESCRIPTION OF THE EMBODIMENTS

Figure 1:
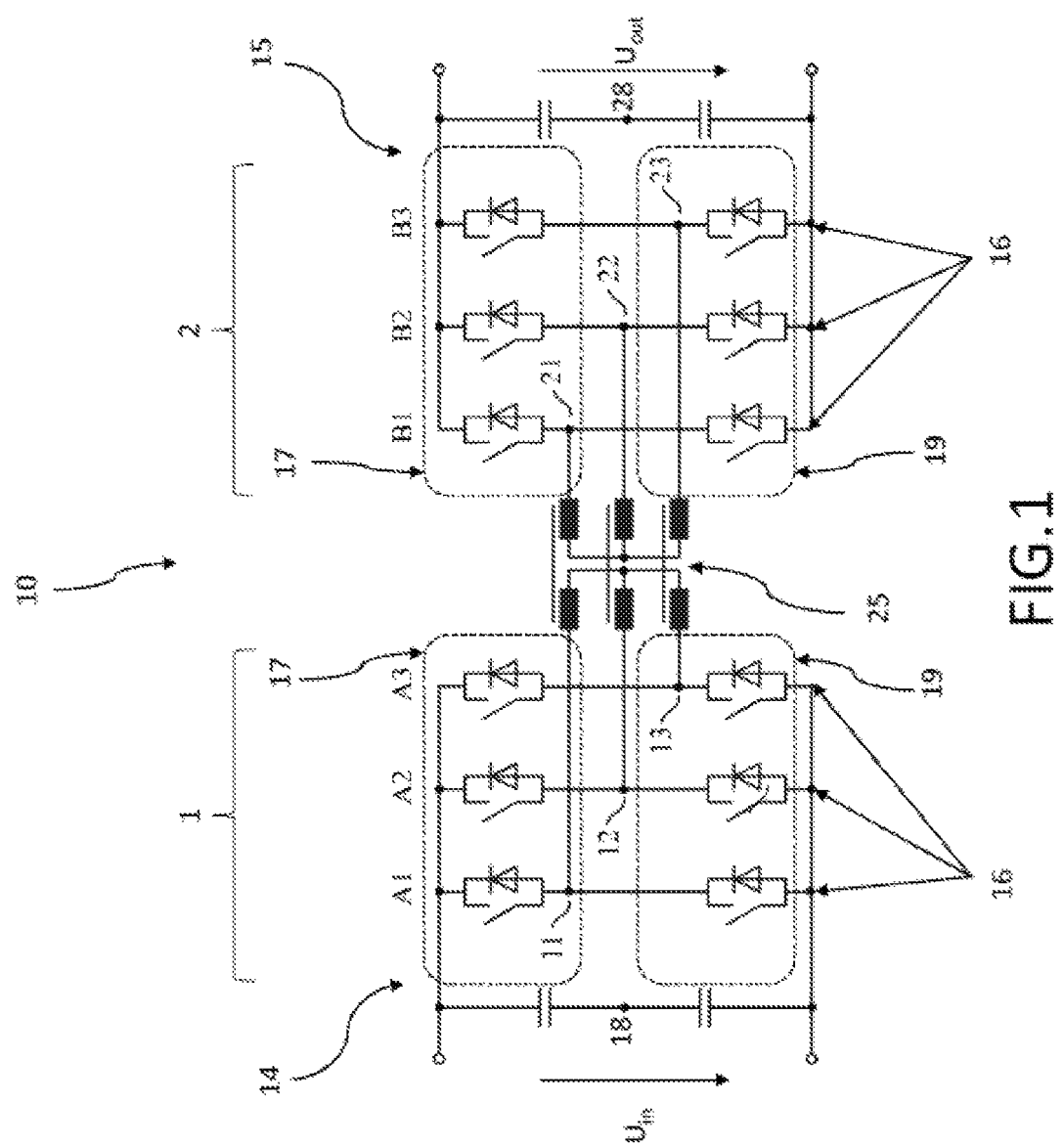
FIG. 1 shows a schematic view of a two-port three-phase active bridge converter, e.g., DAB topology.

FIG. 1 shows a schematic view of an n-port m-phase active bridge converter with n=2 and m=3, which is also called a three-phase dual active bridge (DAB) converter. The n-port m-phase active bridge converter 10 has a number of arbitrary port/s, which are denoted with k, i⊆1, 2, ... n and where m≥1 and n≥2. Each port 1, 2, ... n can be operated as an input or an output port. Each of the ports 1, 2, ... n also has at least m phase legs 16 with multiple active switches 17, 19, where the example is a two-level converter with three phase legs. The ports can convert a DC-voltage U into an AC voltage v and vice versa, where in standard operation the input port/s converts a DC input voltage $U_{in}$ into an AC input voltage and the output port/s convert an AC output voltage into a DC output voltage $U_{out}$. The ports 1, 2, ... n are connected via a m-phase transformer 25 or over separate m transformers 25 each connected to each of the m phase legs 16 of each of the n ports 1, 2, ..., n to transfer power between the ports. The input port of the two-port active bridge (DAB) converter can be called a primary side 14, which has three phase legs A1, A2, A3 16 with an upper active switch 17 and a lower active switch 19 per phase leg 16. The output port of the DAB converter can be called secondary side 15, which has three phase legs B1, B2, B3 16 with an upper active switch 17 and a lower active switch 19 per phase leg 16. The potential nodes 11, 12, 13 on the phase legs of the primary side and 21, 22, 23 on the phase legs of the secondary side are connected with the transformer 25. The DAB converter may include a middle point of the DC link on the primary side 18 and/or a middle point of the DC link on the secondary side 28.

The three-phase DAB DC-DC converter of FIG. 1 consists of two actively switched three-phase bridges linked by a three-phase transformer, typically connected in star-star (Y-Y) configuration. To operate under ZVS conditions, snubber- or resonant-capacitors can be placed across the semiconductor devices. However, under partial load conditions the magnetic stored energy in the transformer inductance may not be sufficient to commutate fully the voltage of the capacitors. Hard-switching events also occur when the sign of the current has not reversed (e.g., is still freewheeling in the diode) prior to switching off the anti-parallel active turn-off device and turning on the other switch in the inverter phase leg. Actually, power semiconductor devices can be destroyed when the energy stored in the capacitors is dumped in them during turn-on. In other words, the current has to be lagging (e.g., inductive) for both bridges to enable zero-voltage switching (ZVS) operation.

Figure 2:
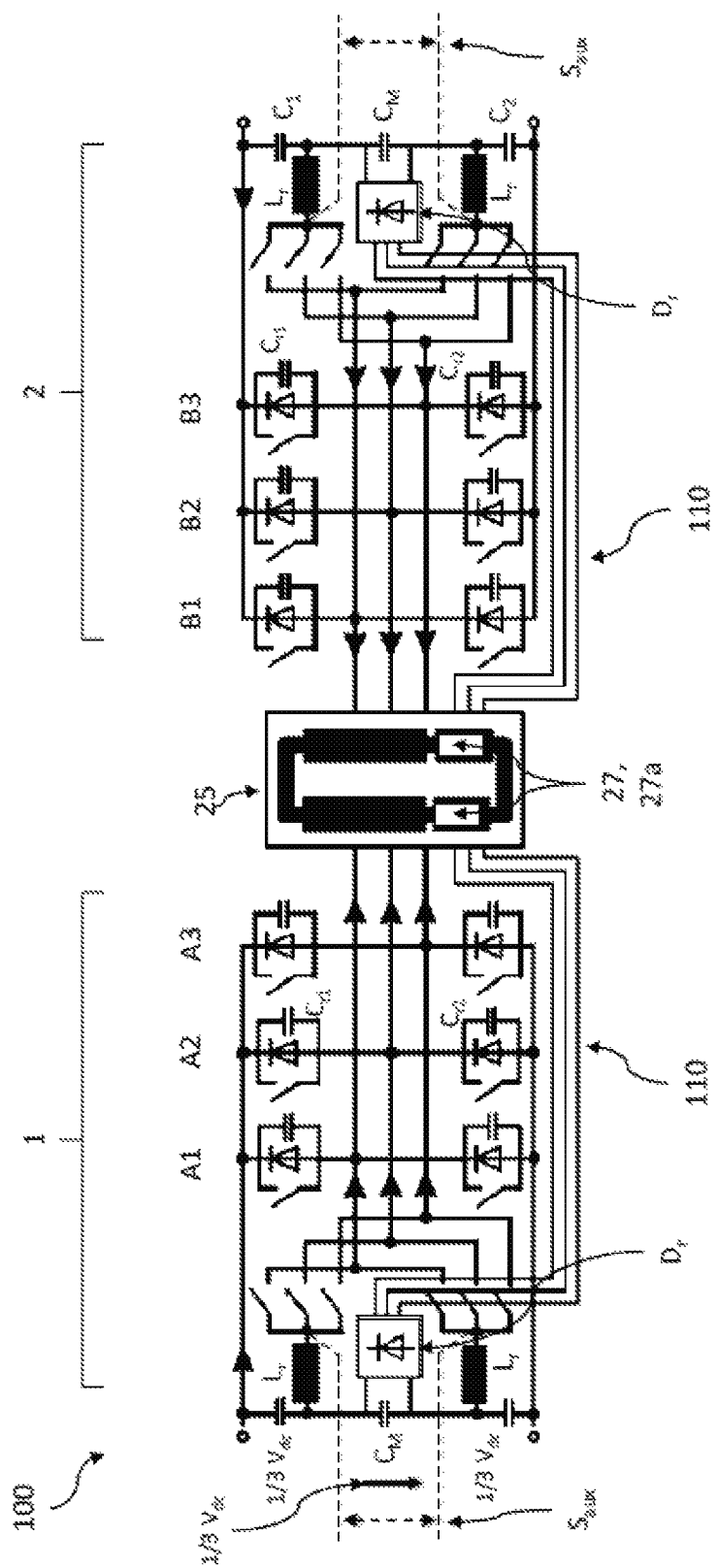
FIG. 2 shows a schematic view of electrical circuit according to the present invention comprising a three-phase DAB and an auxiliary circuit, where the auxiliary power supply is provided by additional windings at the transformer.

FIG. 2 shows a schematic view of electrical circuit 100 according to the present invention including a three-phase DAB and an auxiliary circuit 110, where the auxiliary power supply 27 is provided by additional windings at the transformer 27a. The electrical circuit 100 in this example comprises an two port three phase active bridge converter 10, where each port 1, 2 can be operated as an input or an output port, wherein each of the two ports 1, 2 has three phase legs 16 with multiple active 17, 19 with parallel connected snubber or resonant $C_{r1}$, $C_{r2}$ capacitors, whereby the two ports can convert a DC-voltage $U_{in}$, $U_{out}$ into an AC voltage and vice versa, whereby the two ports 1, 2 are connected via a three-phase transformer 25 (or alternatively over three separate transformers 25 each connected to each of the three phase legs 16 of each of the two ports 1, 2) to transfer power between the ports 1, 2, wherein an auxiliary circuit 110 is connected to the transformers 25 to convert a part of a transformer input voltage and energy via an auxiliary voltage source 27 into a DC mid-point capacitor $C_M$ of a DC-link of at least one of the n-port m-phase active bridge converters 10 to recharge the DC mid-point capacitor $C_M$ enabling the auxiliary circuit to regulate the voltage of the mid-point capacitor $C_M$ providing under all load conditions zero-voltage soft-switching operation of the switches 17, 19 of the converter phase legs 16. Here the auxiliary voltage source 27 is provided by additional windings 27a at the transformer 25 coupled to the mid-point capacitor $C_M$ via one or more diode rectifiers F, whereby the voltage of the auxiliary voltage source 27 is defined by a ratio of the additional windings to transformer windings of the converter 10.

The electrical circuit can also use inductors that are connected in a star arrangement instead of the zero-sequence impedance of the transformer. In this case the transformer does not provide the charging power of $C_M$ and has no extra losses occur in the transformer. The inductors can have separate cores or can be using a three-phase, three-legged core.

Figure 3:
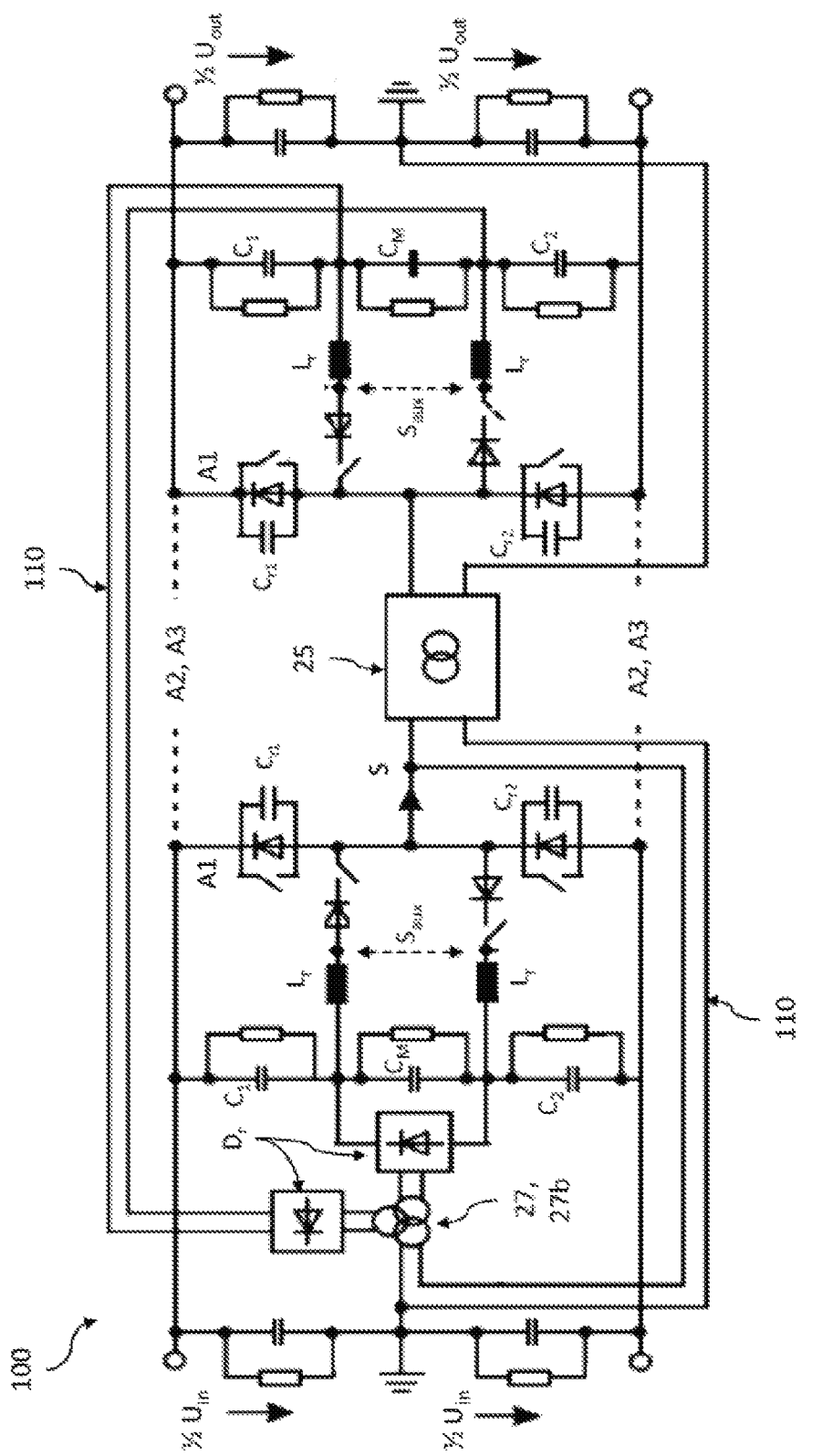
FIG. 3 shows a schematic view of electrical circuit according to the present invention comprising a DAB and an auxiliary circuit shown explicitly for one phase, where the auxiliary power supply is provided by an auxiliary transformer connected to the mid-point capacitor.

FIG. 3 shows a schematic view of electrical circuit 100 according to the present invention including a DAB and an auxiliary circuit 110 shown explicitly for one phase of the two port converter, where the auxiliary power supply 27 is provided by an auxiliary transformer 27b connected to the mid-point capacitor $C_M$. For a better overview the other phases A2 and A3 are only indicated by dashed lines. Nevertheless the shown circuit 110 is also applicable for phases A2 and A3.

Figure 4:
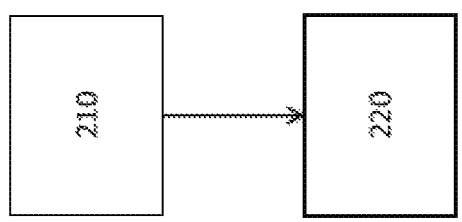
FIG. 4 shows an embodiment of the method according to the present invention.
Figure 4:

FIG. 4 shows an embodiment of the method 200 of operating an electrical circuit 100 including an n-port m-phase active bridge converter 10 with n≥2 and m≥1, where each port 1, 2, . . . n can be operated as an input or an output port, wherein each of the n ports 1, 2 . . . n has three phase legs 16 with multiple active switches 17, 19 with parallel connected snubber or resonant capacitors, whereby the ports 1, 2, . . . n can convert a DC-voltage $U_{in}$, $U_{out}$ into an AC voltage and vice versa, whereby the n ports 1, 2, . . . n are connected via a m-phase transformer 25 or over separate m transformers 25 each connected to each of the m phase legs 16 of each of the ports 1, 2, . . . n to transfer power between the ports 1, 2, . . . n, including the steps of converting 210 a part of a transformer input voltage into a mid-point capacitor $C_M$ of a DC-link of at least one of the ports 1, 2, . . . n of the n-port m-phase active bridge converter 10 via an auxiliary circuit 110 including an auxiliary voltage source connected to the transformers 25 and the mid-point capacitor and providing 220 zero-voltage switching of the switches 17, 19 of the phase legs 16 at zero-voltage under all load conditions by regulating the voltage of the mid-point capacitor $C_M$ via the auxiliary voltage source 27. The regulating of the voltage of the mid-point capacitor $C_M$ may be enabled by additional windings 27a at the transformer 25 coupled to the mid-point capacitor $C_M$ via one or more diode rectifiers $D_r$, whereby the voltage of the auxiliary voltage source 27 is defined by a ratio of the additional windings to transformer windings of the converter 10 or by an auxiliary transformer 27b connected to the mid-point capacitor $C_M$ via a diode rectifier $D_r$, where the auxiliary circuit 110 is connected to transformer 25. The number of phases m might be a number 1. The n-port m-phase active bridge converter 10 might be a two-port m-phase active bridge converter, also called dual active bridge converter. The n-port m-phase active bridge converter 10 might be a two-port three-phase active bridge converter.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

What is claimed is:

1. An electrical circuit for zero-voltage switching of a DC-DC converter comprising an n-port m-phase active bridge converter with n≥2 and m≥1, where each port can be operated as an input or an output port, wherein each of the n ports has m phase legs with multiple active switches with parallel connected snubber or resonant capacitors, wherein the n ports can convert a DC-voltage into an AC voltage and vice versa, wherein the n ports are connected via a m-phase transformer or over m separate transformers each connected to each of the m phase legs of each of the n ports to transfer power between the ports, wherein an auxiliary circuit is connected to the transformers to convert a part of a transformer input voltage and energy via an auxiliary voltage source into a DC mid-point capacitor of a DC-link of at least one of the n-port m-phase active bridge converters to recharge the DC mid-point capacitor enabling the auxiliary circuit to regulate the voltage of the mid-point capacitor providing under all load conditions zero-voltage soft-switching operation of the switches of the converter phase legs.

2. The electrical circuit according to claim 1, wherein the auxiliary voltage source is provided by additional windings at the transformer coupled to the mid-point capacitor via one or more diode rectifiers, wherein the voltage of the auxiliary voltage source is defined by a ratio of the additional windings to transformer windings of the converter; or by an auxiliary transformer connected to the mid-point capacitor via a diode rectifier, where the auxiliary circuit is connected to the transformer.

3. The electrical circuit according to claim 1, wherein the auxiliary circuit comprises one or more single-phase diode rectifiers and auxiliary inductances, two auxiliary switches per phase leg and one or more auxiliary capacitors, wherein the snubber capacitors and the auxiliary inductance form a resonant circuit when one auxiliary switch is turned on, which injects an additional current into the phase legs to provide zero-voltage soft-switching under all load conditions.

4. The electrical circuit according to claim 3, wherein the auxiliary switch is a zero-current switching device, capable of turning on the auxiliary circuit.

5. The electrical circuit according to claim 1, wherein the number of phases m is 3.

6. The electrical circuit according to claim 5, wherein the n-port m-phase active bridge converter is a two-port three-phase active bridge converter.

7. The electrical circuit according to claim 6, wherein the auxiliary inductances are placed between the separate DC-link and the auxiliary switches and four separate inductors are used for the auxiliary circuit.

8. The electrical circuit according to claim 1, wherein the n-port m-phase active bridge converter is a two-port m-phase active bridge converter, also called dual active bridge converter.

9. The electrical circuit according to claim 1, wherein all n ports are connected to an auxiliary circuit to feedback a fraction of the transformer voltage into the ports.

10. The electrical circuit according to claim 1, wherein the number of phases m is larger than three.

11. A method of operating an electrical circuit comprising an n-port m-phase active bridge converter with n≥2 and m≥1, where each port can be operated as an input or an output port, wherein each of the n ports has three phase legs with multiple active switches with parallel connected snubber or resonant capacitors, wherein the n ports can convert a DC-voltage into an AC voltage and vice versa, wherein the n ports are connected via a m phase transformer or over separate m transformers each connected to each of the m phase legs of each of the ports to transfer power between the ports, comprising:
 converting a part of a transformer input voltage into a mid-point capacitor of a DC-link of at least one of the ports of the n-port m-phase active bridge converter via an auxiliary circuit comprising an auxiliary voltage source connected to the transformers and the mid-point capacitor;
 providing zero-voltage switching of the switches of the phase legs at zero-voltage under all load conditions by regulating the voltage of the mid-point capacitor via the auxiliary voltage source.

12. The method according to claim 11, wherein the regulating of the voltage of the mid-point capacitor is enabled by additional windings at the transformer coupled to the mid-point capacitor via one or more diode rectifiers, wherein the voltage of the auxiliary voltage source is defined by a ratio of the additional windings to transformer windings of the converter; or by an auxiliary transformer connected to the mid-point capacitor via a diode rectifier.

13. The method according to claim 11, wherein the number of phases m is a number ≥3.

14. The method according to claim 11, wherein the n-port m-phase active bridge converter is a two-port m-phase active bridge converter.

15. The method according to claim 11, wherein the n-port m-phase active bridge converter is a two-port three-phase active bridge converter.

\* \* \* \* \*